(12) United States Patent
David

(10) Patent No.: US 7,521,664 B2
(45) Date of Patent: Apr. 21, 2009

(54) LASER DIRECTION DETECTION

(75) Inventor: Ofer David, Haifa (IL)

(73) Assignee: Elbit Systems Ltd., Haifa (IL)

(\*) Notice: Subject to any disclaimer, the term of this patent is extended or adjusted under 35 U.S.C. 154(b) by 39 days.

(21) Appl. No.: 11/667,910

(22) PCT Filed: Nov. 24, 2005

(86) PCT No.: PCT/IL2005/001258

§ 371 (c)(1),
(2), (4) Date: May 16, 2007

(87) PCT Pub. No.: WO2006/067781

PCT Pub. Date: Jun. 29, 2006

(65) Prior Publication Data

US 2008/0002192 A1  Jan. 3, 2008

(30) Foreign Application Priority Data

Nov. 28, 2004 (IL) .................................. 165428

(51) Int. Cl.
*G06M 7/00* (2006.01)
*G01J 1/20* (2006.01)

(52) U.S. Cl. .................................. 250/221; 250/203.6

(58) Field of Classification Search ................. 250/221, 250/203.1, 203.3, 203.4, 203.6, 214 R; 342/62; 244/3.1, 3.15, 3.16

See application file for complete search history.

(56) References Cited

U.S. PATENT DOCUMENTS

| | | | |
|---|---|---|---|
| 5,347,120 A | | 9/1994 | Decker et al. |
| 5,428,215 A | \* | 6/1995 | Dubois et al. ............ 250/206.2 |
| 5,604,695 A | \* | 2/1997 | Cantin et al. ............... 356/121 |
| 5,771,092 A | \* | 6/1998 | Dubois et al. ............... 356/147 |
| 6,770,865 B2 | \* | 8/2004 | Wootton et al. ............. 250/226 |
| 6,943,873 B2 | \* | 9/2005 | Sallee ....................... 356/141.1 |

FOREIGN PATENT DOCUMENTS

EP  0506641 A1  9/1992

OTHER PUBLICATIONS

International Search Report for PCT/IL/2005/001258 (6 pages).
Written Opinion of the International Searching Authority for PCT/IL/2005/001258 (7 pages).
Hilland D.H. et al. "Satellite threat warning and attack reporting" Aerospace Conference, 1998 IEEE Snowmass at Aspen, CO USA Mar. 21-28, 1998 (16 pages).

\* cited by examiner

*Primary Examiner*—Que T Le
*Assistant Examiner*—Pascal M Bui-Pho
(74) *Attorney, Agent, or Firm*—Steven M. Jensen; Edwards, Angell Palmer & Dodge LLP

(57) ABSTRACT

Apparatus for determining a direction of low power radiation originating from at least one source, the radiation arriving essentially collimated, the apparatus including an opening, at least two radiation sensors, a respective integrator for each radiation sensor, an integration enabler, a threat detector, and a processor, each integrator being coupled with a respective radiation sensor, the integration enabler being coupled with each integrator, the threat detector being coupled with the integration enabler, and the processor being coupled with the integrators and the threat detector, wherein the opening receives incoming radiation, the radiation sensors being located at different spatial locations behind the opening, each radiation sensor detecting at least a respective portion of the incoming radiation received from the opening and converting the respective portion of the incoming radiation into a respective electric signal, each integrator integrating the respective electric signal, wherein the threat detector detects threats and produces a threat indication for each detected threat, wherein the processor determines the direction according to the amounts of the electrical signals integrated by each of the integrators.

41 Claims, 6 Drawing Sheets

LASER DIRECTION DETECTION

CROSS-REFERENCE TO RELATED APPLICATIONS

This is a national stage filing which is based on and claims priority to and the benefit of International Application No. PCT/IL2005/001258 which itself is based on and claims priority to and the benefit of IL patent application Ser. No. 165428. International Application No. PCT/IL2005/001258 was filed on Nov. 24, 2005, and it was published as International Publication Number WO 2006/067781 on Jun. 29, 2006. IL patent application Ser. No. 165428 was filed on Nov. 28, 2004. The entirety of each of these applications is incorporated herein by reference.

FIELD OF THE DISCLOSED TECHNIQUE

The disclosed technique relates to laser warning receivers in general, and to methods and systems for detecting the presence of very low power laser radiation, usually associated with laser guided weapons, such as laser missile systems, and for determining the angle of arrival of a laser beam associated with such weapons systems, in particular.

BACKGROUND OF THE DISCLOSED TECHNIQUE

A laser missile system is a type of weapons guiding system whereby missiles are guided towards a target by means of a laser beam positioned on the target. U.S. Pat. No. 4,709,875 issued to Cremosnik et al., entitled "Apparatus for guiding a missile" is one of many US patents disclosing systems and methods for laser missile systems. In general, the laser beam is usually spatially encoded, and rasters, or moves in a predefined way, over a specified area at a high modulation frequency. This specified area is used to guide the missile towards the target. The spatial encoding can be achieved by altering the modulation frequency in various spatial sections of the specified area. The spatial encoding can also be achieved by altering the amplitude and wavelength in various spatial sections of the specified area, or by using phase modulation, on-off keying, frequency-shift keying and phase-shift keying, all known in the art. The modulation frequency is the frequency at which laser pulses are emitted from a laser source, and not the wavelength of the laser beam, which remains constant. In general, the modulation frequencies used fall within a definable range.

In general, a user launches a missile and positions the aiming cross of the laser beam on the target. The back end of the launched missile has a detector which continuously determines a particular characteristic of the laser beam hitting its back end. The detector provides the determined particular characteristic to a processor which determines where the launched missile is located in relation to the target. The processor then provides instructions to the on-board flight computer of the launched missile to change its flight direction, if necessary, such that it heads towards the target. As a user continuously moves the laser beam, the launched missile continuously follows the laser beam, always trying to position itself in a particular spatial section of the laser beam.

Laser missile systems are difficult to detect because very low power laser beams are used to guide the missile towards a target. In general, the intensity level of the laser beams used is only slightly higher than the intensity level of noise detected by a detector. Such low levels of intensity make it difficult to differentiate between detected laser beams and detected noise. Furthermore, laser missile systems are even more difficult to detect during the initial seconds after a laser guided missile is launched towards a target because the angle of the spread of the laser beam (herein the spread angle) is initially very large. As the missile heads towards the target, the spread angle decreases and essentially zooms in and focuses in on the target. During the initial seconds when the spread angle is very large, it is difficult to detect and identify the laser beam as originating from a laser guided missile system because the ratio of the intensity of the laser beam to the area over which it is spread is large. This ratio reduces the detected intensity of the already very low power laser beam, thereby giving the laser beam an even closer resemblance to a noise signal.

Very low power laser beam detection and angle of arrival determination systems are known in the art. U.S. Pat. No. 5,771,092 issued to Dubois et al., entitled "Wavelength agile receiver with noise neutralization and angular localization capabilities (WARNALOC)" is directed to an opto-electronic device capable of detecting the presence of a collimated beam of very low power radiation and determining its angle of arrival and wavelength. The device includes a linearly variable optical filter which allows for the transmission of a spectrum of wavelengths over its surface, superimposed over an elongated detector having at least one radiation detector element in each quadrant of the elongated detector.

Radiation incident on the filter will project two separate images of two portions of the filter onto two adjacent detector elements in separate quadrants of the elongated detector. The position of the projected images can be used to determine the wavelength of the radiation. One image is projected onto one side of the elongated detector, while the second image is projected onto the other side of the elongated detector. Each projected image on the elongated detector generates a signal. The signal generated by the second image is subtracted from the signal generated by the first image to reduce background noise. Processing electronics use the two difference signals to determine the angle of arrival of the beam of radiation.

SUMMARY OF THE DISCLOSED TECHNIQUE

It is an object of the disclosed technique to provide a novel method and system for detecting the presence of low power laser radiation and determining the angle of arrival of the radiation, which overcomes the disadvantages of the prior art.

In accordance with the disclosed technique, there is thus provided an apparatus for detecting the presence of low power radiation originating from at least one source. The apparatus includes a radiation sensor, a threshold detector and a counter. The threshold detector is coupled with the radiation sensor and with the counter. The radiation sensor detects incoming radiation and converts the incoming radiation into a corresponding electric signal. The threshold detector produces a potential threat indication each time the electric signal exceeds a threshold level. The counter counts the number of potential threat indications within a potential threat time period. The counter produces a threat indication if the number of counted potential threat indications, within the potential threat time period, exceeds a threat value.

According to another aspect of the disclosed technique, there is thus provided an apparatus for determining a direction of low power radiation originating from at least one source, with the radiation arriving essentially collimated. The apparatus includes an opening, at least two radiation sensors, a respective integrator for each radiation sensor, an integration enabler, a threat detector and a processor. Each integrator is coupled with a respective radiation sensor and with the integration enabler. The threat detector is coupled with the integration enabler. The processor is coupled with each of the integrators and the threat detector.

The opening receives the incoming radiation. The radiation sensors are located at different spatial locations behind the opening, with each radiation sensor detecting at least a respective portion of the incoming radiation received from the opening. The radiation sensors convert the respective portion of the incoming radiation into a respective electric signal. The integrators integrate the respective electric signal. The threat detector detects threats and produces a threat indication for each detected threat. The processor determines the direction of the radiation according to the amounts of electrical signals integrated by each of the integrators.

According to a further aspect of the disclosed technique, there is thus provided a method for detecting the presence of low power incoming radiation originating from at least one source. The method includes the procedures of converting the incoming radiation into a corresponding electric signal, determining an intensity level of the corresponding electric signal, and producing a potential threat indication each time the electric signal exceeds a threshold level. The method further includes the procedures of counting the number of potential threat indications within a potential threat time period, and producing a threat indication if the number of counted potential threat indications, within the potential threat time period, exceeds a threat value.

According to another aspect of the disclosed technique, there is thus provided a method for determining the direction of low power incoming radiation originating from at least one source, with the incoming radiation arriving essentially collimated. The method includes the procedures of receiving the incoming radiation through an opening onto at least two radiation detectors and providing the incoming radiation on the radiation detectors as respective electric signals. The method further includes the procedures of integrating each of the respective electric signals, determining if the incoming radiation originated from a threatening source, and determining a direction for the incoming radiation, if the incoming radiation originated from a threatening source.

The radiation detectors are located behind the opening and are configured to each receive different amounts of the incoming radiation for different directions of the incoming radiation. The integrating commences upon receiving a potential threat indication. The direction of the incoming radiation is determined by comparing the respective amounts of incoming radiation impinging upon the radiation detectors.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a highly selective laser detection and angle of arrival determination design. The selectivity of the design is achieved through the use of a plurality of filters and a probability function describing the chances that detected electric signals correspond to very low power laser beam radiation and not to noise. The highly selective design allows an angle of arrival determination system to only integrate detected very low power laser beam radiation and not detected noise. In general, missiles, using a laser guidance system, are launched at distances which require about 10 seconds of flight time to reach their target. Using the disclosed technique, the presence of such a laser guidance system can be detected, and the angle of arrival of a missile being guided to a target by such a system can be determined, while the missile is in flight.

Figure 1:
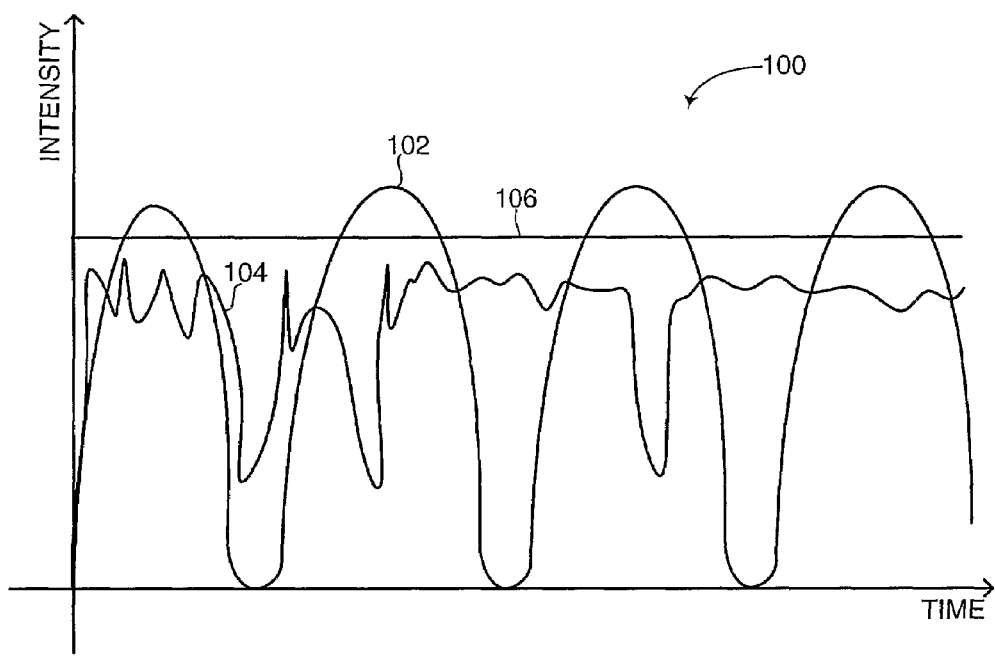
FIG. 1 is a graph depicting laser beam intensity and noise as functions of time, constructed in accordance with an embodiment of the disclosed technique.

Reference is now made to FIG. 1, which is a graph depicting laser beam intensity and noise as functions of time, generally referenced 100, constructed in accordance with an embodiment of the disclosed technique. The horizontal axis of graph 100 represents time and the vertical axis of graph 100 represents intensity. Graph 100 depicts a laser beam signal 102 and a noise signal 104. It is noted that graph 100 is a theoretical graph in the sense that any apparatus which measures the intensity of a laser beam will simultaneously measure any noise signals it receives. As such, the graph drawn from such a measurement will include only one curve, which will be the superposition of the measured laser beam intensity and the measured noise signal. Graph 100 is a graph in which the simultaneous measure of laser beam intensity and noise signal have been separated into two respective curves. Laser beam signal 102 is a very low power signal. As such, the measured intensity level of laser beam signal 102 is only slightly higher that the measured intensity level of noise signal 104. Noise signal 104 is substantially a white noise signal, which means that noise signal 104 isn't correlated to laser beam signal 102 and is thereby present at all wavelengths and amplitudes of laser beam signal 102. The measured intensity level of laser beam signal 102 is typical for laser beams associated with laser guided weapons systems, such as laser missile systems. Graph 100 also includes a threshold level 106, which is set above a predetermined value associated with noise signal 104. The predetermined value can be, for example, a proportional multiplication of the intensity level of noise signal 104. Threshold level 106 can be determined by using a probability model for false alarms, and by applying the model to a single pulse of a pulsed form laser beam signal. For example, the probability model for false alarms developed by S.O. Rice can be used. The average false alarm rate FAR developed by Rice is given as $$FAR = \frac{1}{2\tau\sqrt{3}} e^{\frac{-I_t^2}{2I_n^2}} \quad (1)$$

where $\tau$ is an input pulse duration(s), $I_n^2$ is the root mean square value of a filter output noise current, and $I_t^2$ is the threshold value of a detector. Threshold level 106 can also be determined by field tests, for example in broad daylight. Threshold level 106 is used to set the probability of a false alarm, where a false alarm is defined as an occurrence when noise signal 104 goes above threshold level 106.

Figure 2:
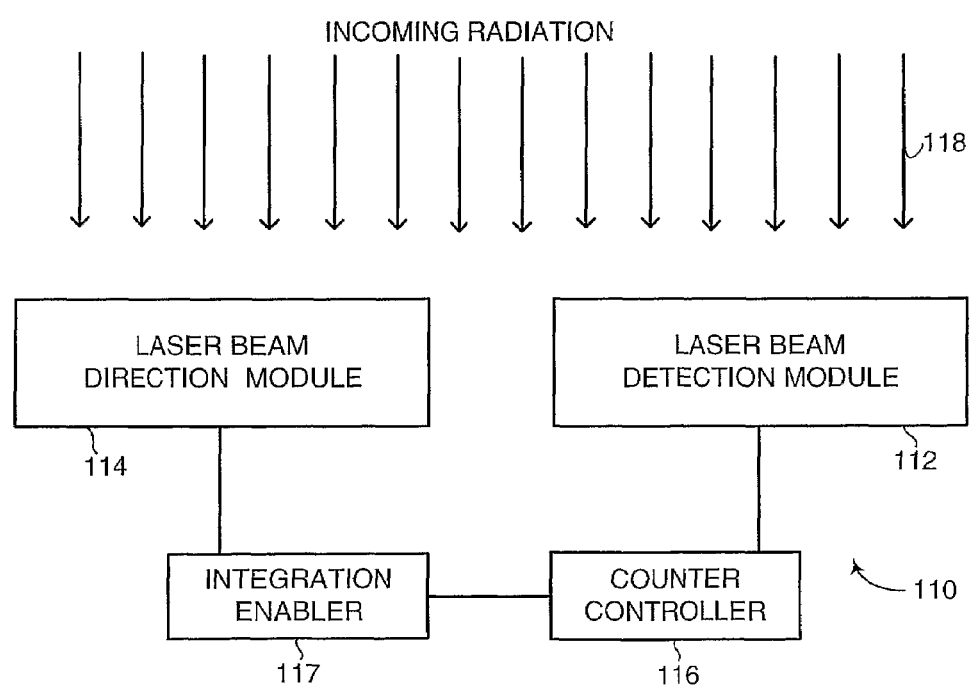
FIG. 2 is a schematic illustration of a laser guided weapons detection and angle of arrival determination system, constructed and operative in accordance with an embodiment of the disclosed technique.

Reference is now made to FIG. 2, which is an illustration of a laser guided weapons detection and angle of arrival determination system, generally referenced 110, constructed and operative in accordance with an embodiment of the disclosed technique. System 110 includes a laser beam detection module 112, a laser beam direction module 114, a counter controller 116 and an integration enabler 117. Laser beam detection module is coupled with counter controller 116. Counter controller 116 is coupled with integration enabler 117. Integration enabler 117 is coupled with laser beam direction module 114. Laser beam detection module 112 is described in further detail in FIG. 3. Laser beam direction module 114 is described in further detail in FIG. 5.

Incoming radiation 118 includes very low power laser radiation originating from a laser source (not shown), for example a laser missile system, and noise signals, originating from various radiation sources (all not shown), for example celestial electromagnetic radiation, like the sun, distantly located laser range finders and the internal electronic components of system 110. The intensity level of incoming radiation 118 is similar to the intensity levels of laser beam signal 102 (FIG. 1) and noise signal 104 (FIG. 1). Incoming radiation 118 impinges on laser beam detection module 112 and laser beam direction module 114 simultaneously. Laser beam detection module 112 filters the received radiation and determines whether incoming radiation 118 originated from a threatening source, for example a laser missile system, or from a non-threatening source, for example a noise source. Laser beam direction module 114 receives incoming radiation 118 and converts the radiation into an electric signal. Laser beam detection module 112 provides potential threat signals to counter controller 116 when incoming radiation 118 is suspected to have originated from a threatening source. Upon receiving a potential threat signal, counter controller 116 provides a potential threat signal to laser integration enabler 117. Upon receiving a predetermined number of potential threat signals, integration enabler 117 directs beam direction module 114 to process the electric signal converted thereto and determine the angle of arrival of incoming radiation 118. It is noted that system 110 can determine the angle of arrival of incoming radiation coming from multiple sources (described in further detail with reference to FIGS. 3 and 5).

Figure 3:
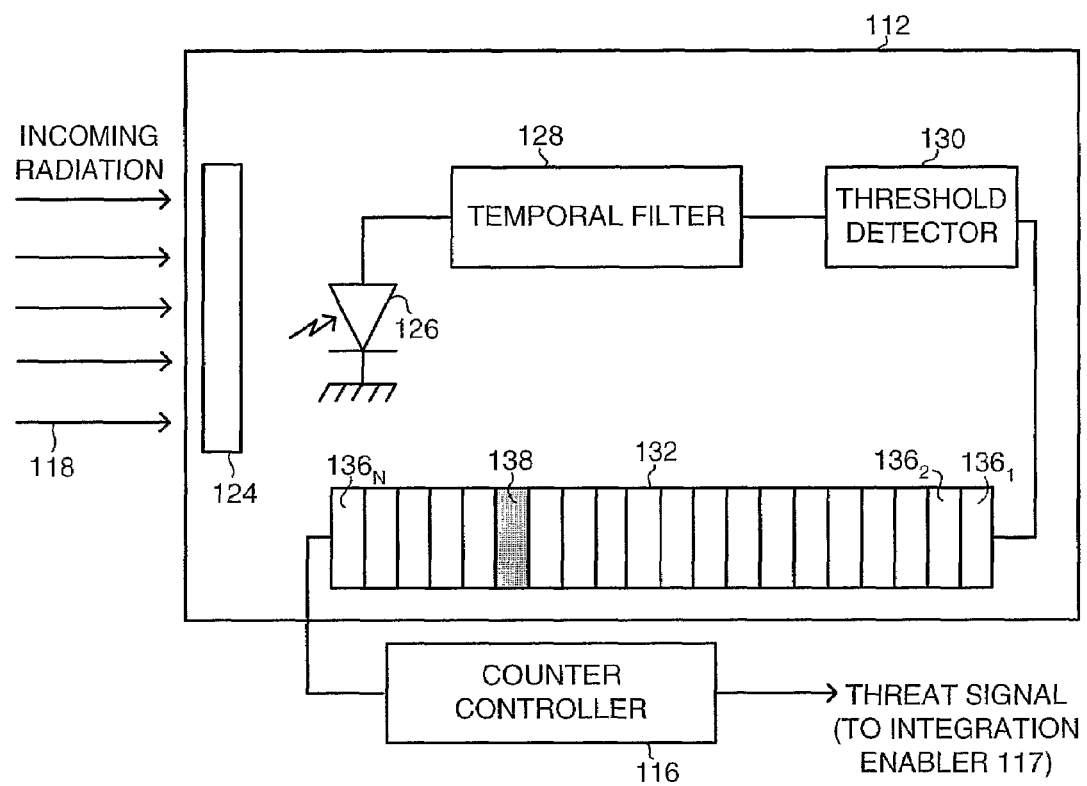
FIG. 3 is a schematic illustration of the laser beam detection module of the system depicted in FIG. 2.

Reference is now made to FIG. 3, which is a schematic illustration of the laser beam detection module of system 110 (FIG. 2), generally referenced 112. Laser beam detection module 112 includes a spectral filter 124, a light sensor 126, a temporal filter 128, a threshold detector 130 and a shift-registry 132. Spectral filter 124 can be a polarizer. Laser beam detection module 112 can also include a day-night sensor (not shown), coupled with a spectral filter, for detecting the presence or absence of sunlight. In an embodiment of the disclosed technique, the spectral filter is not included in laser beam detection module 112. Light sensor 126 converts laser radiation into corresponding electric signals. Light sensor 126 can be, for example, a photodiode. Temporal filter 128 may include a plurality of filters, each addressing different types of predetermined signal characteristics (all not shown). Threshold detector 130 can be implemented, for example, using a comparator (not shown). Shift-registry 132 includes a plurality of registers $136_1$, $136_2$ and $136_N$. Each register can store a "0" bit or a "1" bit. Shift-registry 132 can be substituted by any device capable of counting the number of occurrences of an event, for example, a counter. In an embodiment of the disclosed technique, spectral filter 124 is coupled with light sensor 126 and is located in front of light sensor 126 to receive incoming laser radiation 118. Light sensor 126 is coupled with temporal filter 128. Temporal filter 128 is coupled with threshold detector 130. Threshold detector 130 is coupled with shift-registry 132. Shift-registry 132 is coupled with counter controller 116. In another embodiment of the disclosed technique, the locations of a temporal filter and a threshold detector are reversed, with a light sensor coupled with the threshold detector, the threshold detector coupled with the temporal filter and the temporal filter coupled with a shift-registry.

Incoming radiation 118 impinges on spectral filter 124. Spectral filter 124 selectively allows incoming radiation 118 of specified wavelengths, impinging upon its surface, to pass there through. For example, spectral filter 124 may only allow incoming radiation 118 with wavelengths corresponding to the wavelengths of laser beam radiation associated with laser guided weapons, to pass there through. In another embodiment of the disclosed technique, spectral filter 124 selectively allows incoming radiation 118 of specified polarizations, for example polarizations associated with laser guided weapons, impinging upon its surface, to pass there through. Incoming radiation 118 that passes through spectral filter 124 impinges on light sensor 126. Light sensor 126 generates an electric signal corresponding to the laser radiation impinging thereto. The signal generated by light sensor 126 is provided to temporal filter 128. Temporal filter 128 selectively allows electric signals corresponding to spatially encoded laser beams to pass there through. Each type of spatial encoding corresponds to a predetermined set of signal characteristics. For example, in an embodiment of the disclosed technique, if incoming radiation 118 is spatially encoded using different modulation frequencies, $f_1$ to $f_n$, temporal filter 128 includes a band pass filter. This band pass filter can be formed by combining a high pass filter and a low pass filter. The band pass filter creates a signal window corresponding to the modulation frequency range of $f_1$ to $f_n$, and only allows an electric signal to pass there through if the electric signal falls within the signal window. Since incoming radiation 118 may be spatially encoded using different encoding methods, in another embodiment of the disclosed technique, temporal filter 128 may include a plurality of filters, each filter including a predetermined set of signal characteristics corresponding to a particular method of spatially encoding laser beams. In this embodiment, the signal provided to temporal filter 128 is directed, by a demultiplexer (not shown), to the filter therein corresponding to the method of spatial encoding used.

The temporally filtered signal is provided to threshold detector 130 where the intensity level of the signal provided thereto is determined. If the intensity level is below threshold level 106 (FIG. 1), the signal is considered a noise signal and is abandoned. If the intensity level is at threshold level 106, or above threshold level 106, the signal is considered to have originated from a threatening source and threshold detector 130 provides a signal to shift-registry 132 to register a count. The signal provided to shift-registry 132 can be any type of indication that signifies the intensity level of incoming radiation 118 is at or above threshold level 106. Threshold level 106 can be determined empirically through field tests of system 110, for example in broad daylight, or mathematically through a probability model for false alarms, in accordance with the desired sensitivity level of system 110. Since threshold level 106 substantially sets the sensitivity of laser beam detection module 112, threshold level 106 needs to be set appropriately depending on the scenario system 110 is used in and the type of threats system 110 is to detect. In an embodiment of the disclosed technique, threshold level 106 is set to a fixed sensitivity level, for example a sensitivity level appropriate for using laser beam detection module 112 in direct sunlight. In another embodiment of the disclosed technique, threshold level 106 is varied to different sensitivity levels depending on the time of day laser beam detection system 112 is used, for example, a higher sensitivity level during the day, when it is sunny, and a lower sensitivity level during the night, and during the day when it is cloudy. Shift-registry 132 registers a count by storing a "1" bit in register $136_1$. Initially, every register in shift-registry 132 contains a "0" bit. Each time a count is registered, all the bits in shift-registry 132 are shifted over by one register, with the bit stored in register $136_N$ being written over and a "1" bit being stored in register $136_1$. The shifting over by one register can either be to the left or right, depending on how shift-registry 132 is coupled with threshold detector 130. In laser beam detection module 112, each time a count is registered, all the bits in shift-registry 132 are shifted over by one register to the left. Shift-registry 132 registers counts for a potential threat time period. At the end of each potential threat time period, counter controller 116 resets all bits stored in registers $136_1$, $136_2$ and $136_N$ to "0" bits. Alternatively, or in addition to, the end of a potential threat time period criterion, other criteria can be used for resetting all the bits stored in shift-registry 132 to "0" bits. These criteria are explained with reference to FIG. 5. The potential threat time period can be, for example, 20 milliseconds. It is noted that since the potential threat time period is in general a fraction of a second, laser beam detection module 112 can determine, essentially simultaneously, whether various beams of incoming radiation, coming from multiple sources, each originated from a threatening source or not. Since the calculation time of whether a beam of incoming radiation originated from a threatening source or not is usually on the order of a few hundred milliseconds, the probability that two beams of radiation will arrive at laser beam detection module 112 within a few microseconds of one another is very small. Most of the time the various beams of incoming radiation arriving at laser beam detection module 112 will arrive at time intervals, spaced far enough apart, such that laser beam detection module 112 can determine whether the radiation originated from a threatening source or not.

As described in FIGS. 2 and 3, laser beam detection module 112 of system 110 can determine whether incoming radiation 118 originated from a threatening source, or from a non-threatening source, during the day or at night, when incoming radiation 118 is in pulsed wave form. Spectral filter 124, temporal filter 128 and threshold detector 130 together enable laser beam detection module 112 to differentiate between continuous wave sources, for example, the sun or the headlights of a passing vehicle, from pulsed wave sources, for example a laser missile system, besides determining whether incoming radiation 118 originated from a threatening or non-threatening source. It is noted that the sun is the strongest source of continuous wave radiation during the day, which contributes to the noise signal. Laser beam detection module 112 can also determine whether incoming radiation 118 originated from a threatening source, or from a non-threatening source, when incoming radiation 118 is in continuous wave form (e.g., when incoming radiation 118 is continuous wave infrared radiation). However, this determination is possible only at night. In the case where continuous wave form radiation is detected at night, a light sensor generates an electric signal corresponding to the laser radiation impinging thereto, and provides the signal directly to a threshold detector. A temporal filter is not used, since a temporal filter is used to differentiate between pulsed radiation originating from a threatening source, and pulsed radiation and continuous wave radiation originating from a non-threatening source.

Figure 4:
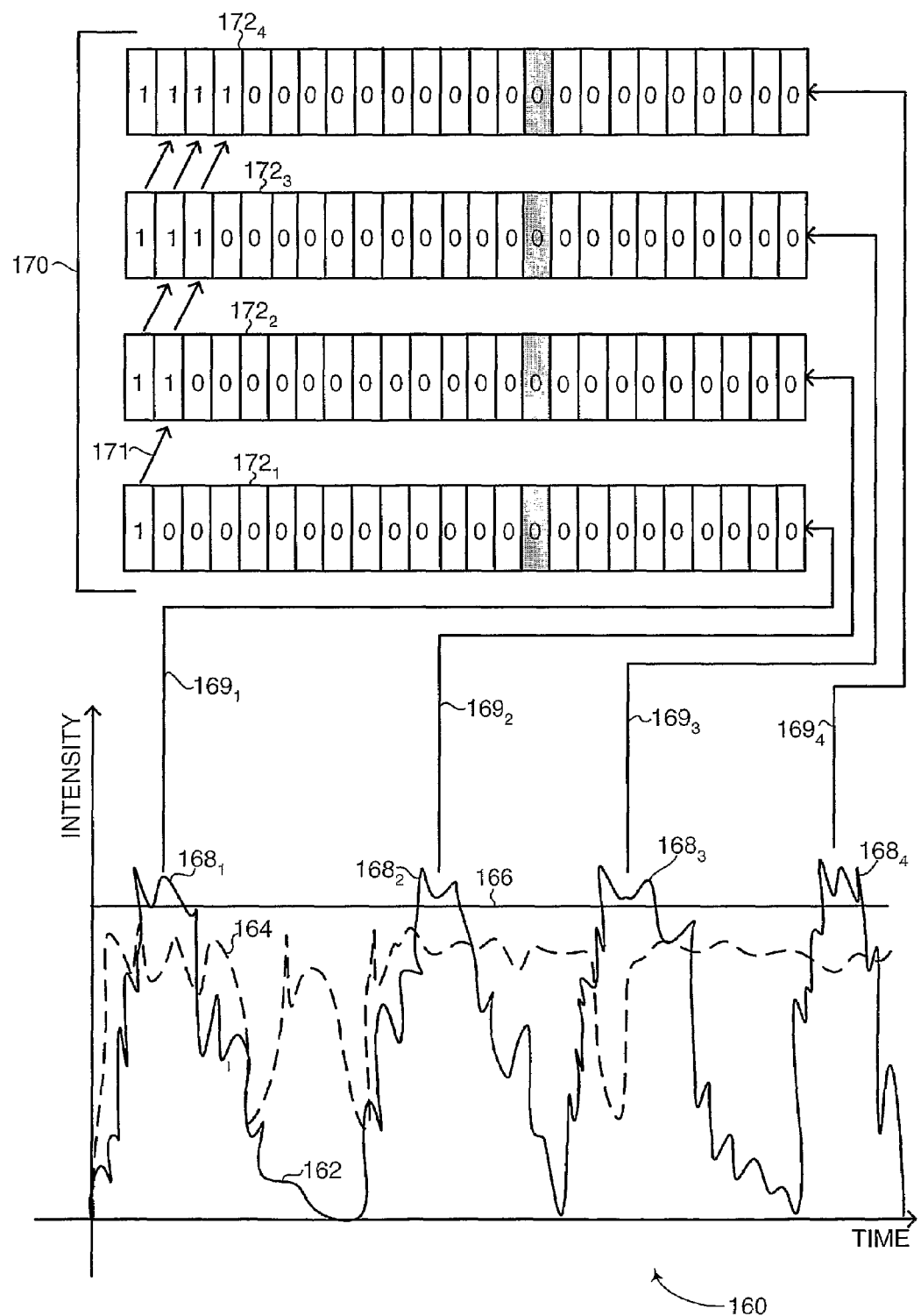
FIG. 4 is an illustration depicting the changes in a shift-registry as it corresponds to a graph depicting the intensity of a laser beam signal as a function of time, constructed in accordance with an embodiment of the disclosed technique.

Reference is now made to FIG. 4, which is an illustration depicting the changes in a shift-registry, generally referenced 170, as it corresponds to a graph depicting the intensity of a laser beam signal as a function of time, generally referenced 160, constructed in accordance with an embodiment of the disclosed technique. The horizontal axis of graph 160 represents time and the vertical axis of graph 160 represents intensity. Graph 160 depicts a laser beam signal 162 superimposed with noise signals. Laser beam signal 162 is a very low power signal. As such, the measured intensity level of laser beam signal 162 is only slightly higher that the measured intensity level of a pure noise signal 164. Graph 160 also includes a threshold level 166, which is set above a predetermined value associated with noise signal 164. The predetermined value can be, for example, a proportional multiplication of the intensity level of noise signal 164. Laser beam signal 162 includes four peaks $168_1$, $168_2$, $168_3$ and $168_4$, each of which corresponds to a particular instance in time, at which the intensity level of laser beam signal 162 is greater than threshold level 166.

The changes in shift-registry 170 include four particular shift-registries $172_1$, $172_2$, $172_3$ and $172_4$, each at a different instance in time of shift-registry 170. Each instance in time of shift-registry 170 corresponds to one of peaks $168_1$, $168_2$, $168_3$ and $168_4$. This correspondence is indicated in FIG. 4 by arrows $169_1$, $169_2$, $169_3$ and $169_4$, which connect peaks $168_1$, $168_2$, $168_3$ and $168_4$ to shift-registries $172_1$, $172_2$, $172_3$ and $172_4$. Initially, each register in shift-registry 170 contains a "0" bit. Each time laser beam signal 162 passes threshold level 166, a count is registered by shifting all the bits over one register to the right, and placing a "1" bit in the left most register. Shift-registry $172_1$ corresponds to an instance in time when laser beam signal 162 passes threshold 166 and forms peak $168_1$. At this instance in time, all the bits in the registers of shift-registry 170 are shifted over one register to the right, with right most bit being written over, and a "1" bit is placed in the left most register. Shift-registry $172_2$ corresponds to an instance in time when laser beam signal 162 passes threshold 166 a second time and forms peak $168_2$. At this instance in time, all the bits in the registers are shifted over one register to the right, and a "1" bit is placed in the left most register. Note that the "1" bit placed in shift-registry $172_1$ has been shifted over one register to the right. This shifting over is indicated in FIG. 4 by arrow 171. Shift-registry $172_3$ corresponds to an instance in time when laser beam signal 162 passes threshold 166 a third time and forms peak $168_3$. At this instance in time, all the bits in the registers are shifted over one register to the right, and a "1" bit is placed in the left most register. Shift-registry $172_4$ corresponds to an instance in time when laser beam signal 162 passes threshold 166 a fourth time and forms peak $168_4$. At this instance in time, all the bits in the registers are again shifted over one register to the right, and a "1" bit is placed in the left most register.

Referring back to FIG. 3, shift-registry 132 registers a count each time the intensity level of the signal provided to threshold detector 130 is at or above threshold level 106 (FIG. 1). Counts are registered for a potential threat time period, at which point counter controller 116 resets all the bits in shift-registry 132 to "0". A count represents a signal that fits the characteristics of a signal originating from a threatening source, although the signal may have originated from another, possibly non-threatening, source. As the number of counts registered in a potential threat time period increases, the probability that the counts registered originated from a threatening source, for example a laser missile system, also increases.

This probability is used by laser beam detection module 112 to differentiate between noise signals detected by system 110 and threatening laser sources impinging upon system 110.

This probability can be stated mathematically as $$P(D) = \sum_{j=m}^{n} q^j \cdot (1-q)^{n-j} \cdot \frac{n!}{j! \cdot (n-j)!} \quad (2)$$

where P(D) defines the overall probability of detection, meaning that incoming radiation 118 falling incident on system 110 originated from a threatening source, q is the probability that a single count which actually originated from a threatening source will be at or above threshold level 166 (FIG. 4), j is an index number corresponding to the individual registers of shift-registry 132, m is a predetermined number of counts needed to be registered in shift-registry 132, in a potential threat time period, such that system 110 (FIG. 2) goes into a threat mode (explained with reference to FIG. 5) and n is the number of registers in shift-registry 132. Using terms known in the field of probability, m can be associated with the number of success, meaning the number of times a count is registered, and n can be associated with the number of trials, meaning the number of times, in a potential threat time period, incoming radiation 118 is verified to determine if it will register a count. m is defined as the hit value, or the threat value. The values for q can be determined by field tests of system 110, or mathematically by using a probability model for false alarms. Since m defines the threat value, all counts in registers, with an index number equal to or greater than m, are factored into P(D) by summation since registers registering a count, with an index greater than m, indicate that incoming radiation 118 originated from a threatening source with a certainty greater than the certainty associated with the hit value.

The hit value can be predetermined by using Equation (2). In shift-registry 132, the hit value is designated by a hit register 138. If hit register 138 registers a count, then the probability that incoming radiation 118 originated from a threatening source is considered high and system 110 goes in a threat mode. Each time shift-registry 132 registers a count, laser beam detection module 112 provides a potential threat signal to counter controller 116. The potential threat signal provided to counter controller 116 can be any type of indication that signifies that shift-registry 132 has registered a count. The potential threat signal provided to counter controller 116 is further provided to integration enabler 117 (FIG. 2). In an embodiment of the disclosed technique, as the probability that incoming radiation 118 originated from a threatening source increases, the threat value is lowered. The threat value is lowered once laser beam detection module 112 has determined that incoming radiation 118 originated from a threatening source. Counter controller 116 then determines the modulation frequency of incoming radiation 118 by dividing the threat value by the duration of time it takes shift-registry 132 (FIG. 3) to register a count in hit register 138. The modulation frequency is determined in order to continuously verify that incoming radiation 118 is still originating from a threatening source and that system 110 should therefore remain in a threat mode until the end of a potential threat time period.

Figure 5:
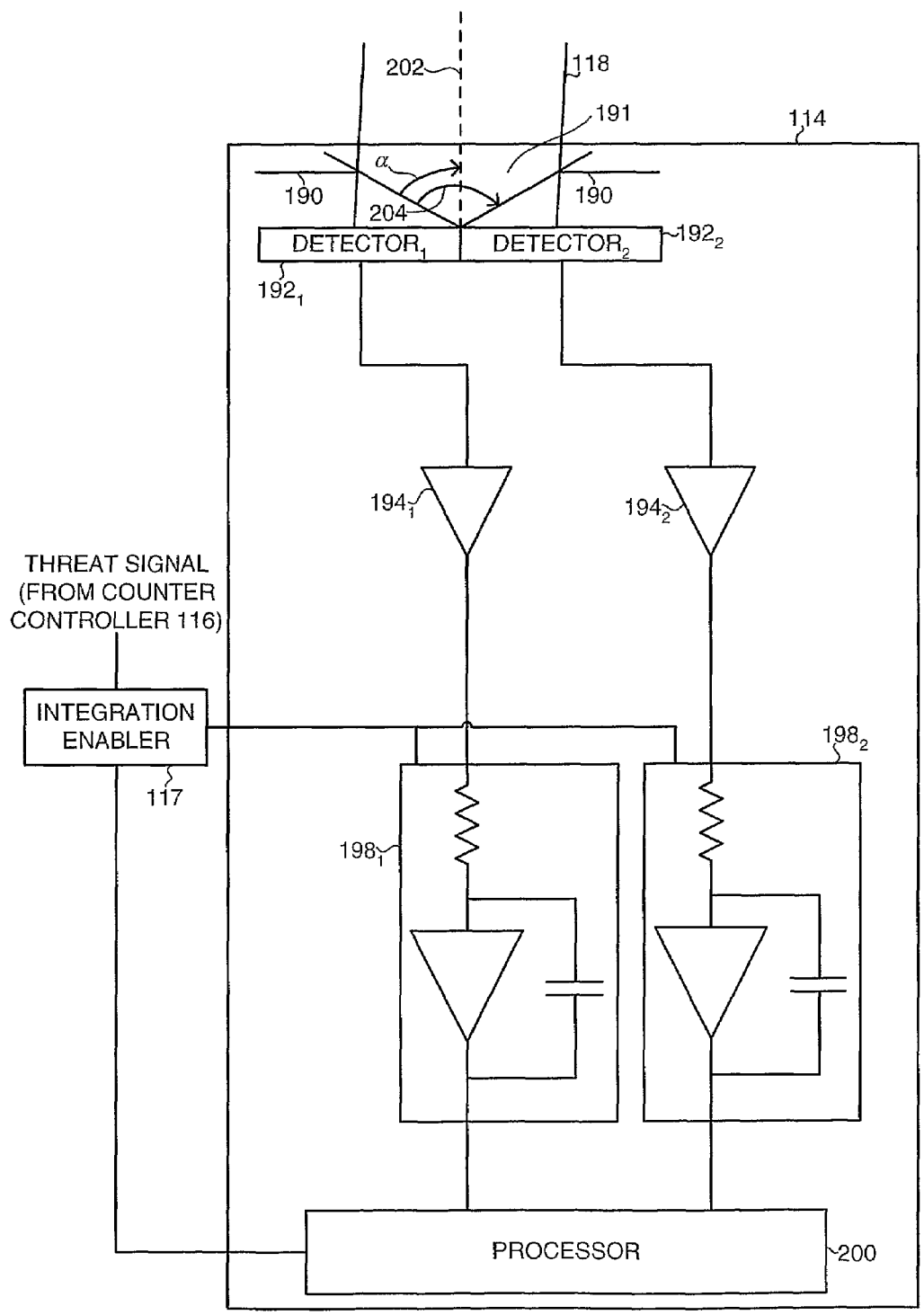
FIG. 5 is a schematic illustration of the laser beam direction module of the system depicted in FIG. 2.

Reference is now made to FIG. 5, which is a schematic illustration of the laser beam direction module of system 110 (FIG. 2), generally referenced 114. Laser beam direction module 114 includes a plate 190, two detectors 192₁ and 192₂, two amplifiers 194₁ and 194₂, two integrators 198₁ and 198₂, and a processor 200. Plate 190 includes an opening 191. Plate 190 can be a mask. Opening 191 can be an aperture. Detectors 192₁ and 192₂ are located behind plate 190. In an embodiment of the disclosed technique, detectors 192₁ and 192₂ are located adjacent to one another, evenly located behind opening 191 such that incoming radiation 118 passing through opening 191 impinges upon an equal amount of surface on detectors 192₁ and 192₂ if incoming radiation 118 passes through plate 190 perpendicularly. In another embodiment of the disclosed technique, the detectors are located behind the opening such that different amounts of incoming radiation 118 impinge upon each of the surfaces of the detectors, for different angles of arrival of incoming radiation 118. In a further embodiment of the disclosed technique, the detectors are not located adjacent to one another, but are evenly located behind the opening. In another embodiment of the disclosed technique, the detectors are not located adjacent to one another, and are not evenly located behind the opening. However, the detectors are located behind the opening such that different amounts of incoming radiation 118 impinge upon each of the surfaces of the detectors, for different angles of arrival of incoming radiation 118.

In another embodiment of the disclosed technique, opening 191 has substantially the same width as each of detectors 192₁ and 192₂, such that when incoming radiation 118 passes through opening 191 perpendicularly, incoming radiation 118 impinges upon substantially half of the total surface area of each of detectors 192₁ and 192₂. In a further embodiment of the disclosed technique, the opening has a width that is substantially not equal to the width of the detectors. Detectors 192₁ and 192₂ can be photodetectors. Detector 192₁ is coupled with amplifier 194₁ and detector 192₂ is coupled with amplifier 194₂. Amplifier 194₁ is coupled with integrator 198₁ and amplifier 194₂ is coupled with integrator 198₂. Integration enabler 117 is coupled with processor 200. In a further embodiment of the disclosed technique, laser beam direction module 114 includes a switch, and a plurality of amplifiers and integrators. In this embodiment of the disclosed technique (not shown), each of the detectors is coupled with the switch, each amplifier is coupled with the switch, and each integrator is coupled with a respective amplifier. Each integrator is coupled with a processor. In this embodiment of the disclosed technique, laser beam direction module 114 can determine, essentially simultaneously, the angle of arrival of multiple beams of incoming radiation originating from different sources.

In another embodiment of the disclosed technique, integration enabler 117 is also coupled with integrators 198₁ and 198₂. In a further embodiment of the disclosed technique, the integration enabler is also coupled with the amplifiers (not shown). In another embodiment of the disclosed technique, the integration enabler is also coupled with the detectors (not shown). In a further embodiment of the disclosed technique, the integration enabler is also coupled with a shutter (not shown) located in front of opening 191. In another embodiment of the disclosed technique, diodes (not shown) are coupled with the amplifiers and the integrators, in order to prevent electrical spikes, flowing out from the electrical switches (not shown) into integrators 198₁ and 198₂, from providing inaccurate signal information to the various components of system 110. Electrical spikes can occur as a result of Lenz's Law or switching noise, as is known in the art. Integrators 198₁ and 198₂ are coupled with processor 200. Processor 200 can be an ADC (analog-to-digital converter). Line 202 is perpendicular to the surface of plate 190.

Incoming radiation 118 impinges on plate 190. Plate 190 allows an amount of laser beam radiation to pass through opening 191 and fall incident on detectors $192_1$ and $192_2$. Since detectors $192_1$ and $192_2$ are evenly located behind opening 191, more laser beam radiation will fall on the surface of one of the detectors if the angle of arrival of incoming radiation 118 is not parallel to line 202. The relative difference between the amount of laser beam radiation falling incident on the surfaces of detectors $192_1$ and $192_2$ can be used to determine the angle of arrival of incoming radiation 118. It is noted that the effect of any noise on the signals generated by detectors $192_1$ and $192_2$ will substantially average out to zero because the signals are subtracted from one another. If the angle of arrival is greater than a critical angle $\alpha$, measured on either side of line 202, then incoming radiation 118 will only directly impinge on the surface of one of the detectors, and hence the angle of arrival cannot be determined. Critical angle $\alpha$ depends on the configuration of opening 191, the distance between opening 191 and detectors $192_1$ and $192_2$, and the distance between detectors $192_1$ and $192_2$. Critical angle $\alpha$ is, in general, less than 90 degrees, and can be, for example, 22.5 degrees. Laser beam direction module 114 can therefore determine an angle of arrival spanning a range of $2\alpha$ degrees, depicted in FIG. 5 by arrow 204. In an embodiment of the disclosed technique, a plurality of laser beam direction modules 114 are used to achieve an angle of arrival determination range of 360 degrees. In this embodiment, each laser beam detection module 114 is placed next to one another in a circular manner, with each module located at $2\alpha$ degrees from one another.

Detectors $192_1$ and $192_2$ each generate an electric signal corresponding to the amount of laser beam radiation impinging upon their respective surfaces. The electric signals generated by detectors $192_1$ and $192_2$ are each respectively provided to amplifiers $194_1$ and $194_2$ which are coupled thereto. Amplifiers $194_1$ and $194_2$ provide their respective signals to integrators $198_1$ and $198_2$. Integration enabler 117 enables and disables integrators $198_1$ and $198_2$. When no potential threat signal is detected by integration enabler 117, from counter controller 116, integrators $198_1$ and $198_2$ are disabled and, thereby, do not integrate any signal received thereto. When a potential threat signal is detected by integration enabler 117, from counter controller 116, integrators $198_1$ and $198_2$ are enabled and, thereby, integrate signals received thereto. Integrators $198_1$ and $198_2$ remain enabled as long as integration enabler 117 receives a potential threat signal from counter controller 116. If a count is registered in shift-registry 132, counter controller 116 provides a potential threat signal, for a particular duration of time, to integration enabler 117, which in turn enables integrators $198_1$ and $198_2$ for a corresponding particular duration of time. The particular duration of time is defined by characteristics of incoming radiation 118. If incoming radiation 118 is short pulsed radiation (i.e., radiation having a pulse width on the order of nanoseconds), then counter controller 116 provides a potential threat signal for a predetermined duration of time. The predetermined duration of time can be determined theoretically, empirically, through field tests of system 110 or from known properties of the threatening source. For example, if the pulse width of incoming radiation 118 is 100 ns, then the predetermined duration of time the potential threat signal is provided may be a few microseconds. If incoming radiation 118 is radiation emerging from a laser with a duty factor on the order of 50% (i.e, radiation having a pulse width on an order larger than, for example, 100 ns), then the potential threat signal is provided for the duration of time laser beam signal 162 is above threshold level 166. In the embodiment of the disclosed technique, in which laser beam direction module 114 includes a switch, and a plurality of amplifiers and integrators, laser beam direction module 114 can determine each of the directions of multiple beams of incoming radiation. In this embodiment of the disclosed technique, detectors $192_1$ and $192_2$ each generate an electric signal corresponding to the amount of laser beam radiation impinging upon their respective surfaces. According to the wavelength, polarization and spatial encoding of the incoming radiation, the electric signals generated by detectors $192_1$ and $192_2$ are each respectively directed and provided to a corresponding set of amplifiers and integrators via the switch. Since the potential threat signal, provided by counter controller 116, is provided for a predetermined time period, which is in general a fraction of a second, the probability that multiple beams of incoming radiation will arrive at laser beam direction module 114 at the same time is very low. Most of the time, the various beams of incoming radiation, arriving at laser beam direction module 114, will arrive at time intervals, spaced far enough apart, such that the switch can properly direct the electric signals generated by detectors $192_1$ and $192_2$ to the appropriate set of amplifiers and integrators.

Integrators $198_1$ and $198_2$ cumulatively integrate until system 110 (FIG. 2) goes into a threat mode. System 110 goes into a threat mode once hit register 138 (FIG. 3) registers a count. A threat mode indicates that system 110 now considers incoming radiation 118 to have originated from a threatening source. In a threat mode, integrators $198_1$ and $198_2$ continue to cumulatively integrate until a predetermined integration threshold, or a predetermined time threshold, is reached, at which point the integrators are reset. The predetermined integration threshold can be, for example, the signal saturation value of the integrators. The predetermined time threshold can be, for example, the amount of time system 110 would require to identify a change in direction of incoming radiation 118, which could be, for example, on the order of milliseconds. It is noted that in a threat mode, integrators $198_1$ and $198_2$ may be reset many times in a potential threat time period. Integrators $198_1$ and $198_2$ can also cumulatively integrate until the end of a potential threat time period, when counter controller 116 resets all the bits in shift-registry 132 back to "0" bits. Counter controller 116 can also be enabled to reset all the bits in shift-registry 132 back to "0" bits if at least one of the following criteria is true:

the sum of the measured intensity level of incoming radiation 118, on the detecting surfaces of detectors $192_1$ and $192_2$, is less than a predetermined intensity threshold level.

a count has not been registered in shift-registry 132 for a predetermined amount of time, for example a few milliseconds.

incoming radiation 118 is incident on only one of the detectors, either only on detector $192_1$ or only on detector $192_2$.

It is noted that in using these criteria, for resetting all the bits in shift-registry 132 back to "0" bits, shift-registry 132 may be reset many times within a single potential threat time period.

If hit register 138 contains a "0" bit at the end of a potential threat time period, then counter controller 116 provides a signal to integration enabler 117, which in turn provides a signal to processor 200, to abandon the cumulative integrated signal of integrators $198_1$ and $198_2$. If hit register 138 contains a "1" bit, which indicates that system 110 is in a threat mode, then counter controller 116 provides a signal to integration enabler 117, which in turn provides a signal to processor 200, to determine the angle of arrival of incoming radiation 118 based on the cumulative integrated signal of integrators $198_1$ and $198_2$. In a threat mode, integration enabler 117 continuously provides a signal to processor 200, to continuously determine the angle of arrival of incoming radiation 118, based on the cumulative integrated signal of integrators $198_1$ and $198_2$, until the end of a potential threat time period, when all bits in shift-registry 132 are reset back to "0" bits.

In another embodiment of the disclosed technique, integration enabler 117 enables and disables amplifiers $194_1$ and $194_2$. When no potential threat signal is detected by integration enabler 117, amplifiers $194_1$ and $194_2$ are disabled and, thereby, do not provide their respective signals to integrators $198_1$ and $198_2$. When a potential threat signal is detected by integration enabler 117, amplifiers $194_1$ and $194_2$ are enabled and, thereby, provide their respective signals to integrators $198_1$ and $198_2$. In a further embodiment of the disclosed technique, integration enabler 117 enables and disables detectors $192_1$ and $192_2$. When no potential threat signal is detected by integration enabler 117, detectors $192_1$ and $192_2$ are disabled and, thereby, do not convert the amount of laser beam radiation impinging thereto into corresponding electric signals. When a potential threat signal is detected by integration enabler 117, detectors $192_1$ and $192_2$ are enabled and, thereby, generate an electric signal corresponding to the amount of laser beam radiation impinging upon their respective surfaces and provide the respective electric signal to amplifiers $194_1$ and $194_2$. In another embodiment of the disclosed technique, integration enabler 117 enables and disables a shutter (not shown) located in front of opening 191.

Amplifiers $194_1$ and $194_2$ only provide their respective signals to integrators $198_1$ and $198_2$ for a short amount of time each time shift-registry 132 registers a count. This means that integrators $198_1$ and $198_2$ only integrate the amount of incoming radiation 118, impinging on the respective surfaces of detectors $192_1$ and $192_2$, once there is some probability that incoming radiation 118 originated from a threatening laser source. Integrators $198_1$ and $198_2$ integrate the respective electric signals provided thereto and further provide respective electric signals to processor 200. Processor 200 determines the angle of arrival of incoming radiation 118 by comparing the signals received from integrators $198_1$ and $198_2$, and provides the determined angle of arrival to a user. In an embodiment of the disclosed technique, the comparing includes subtracting the signal received from one integrator, for example, integrator $198_2$, from the signal received from the other integrator, for example, integrator $198_1$. The subtraction result is normalized by dividing the subtraction result by the sum of the two signals received from integrators $198_1$ and $198_2$. In another embodiment of the disclosed technique, the comparing includes retrieving the angle of arrival of incoming radiation 118, in a normalized look-up table, corresponding to a normalization of the signal received from each integrator.

Figure 6:
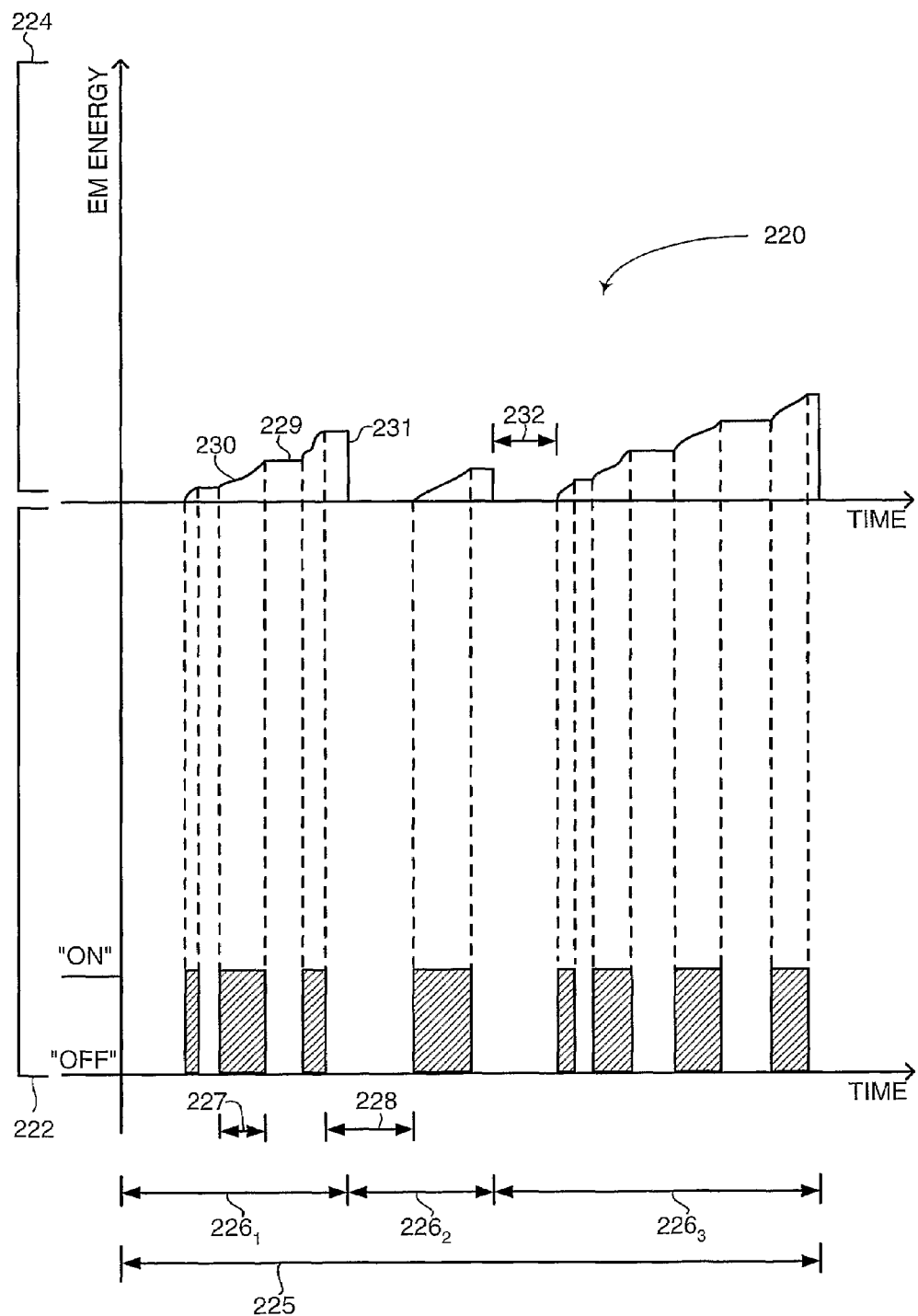
FIG. 6 is a graph depicting the on-off state of an integrator and the amount of electromagnetic radiation integrated in an integrator as functions of time, constructed in accordance with an embodiment of the disclosed technique.

Reference is now made to FIG. 6, which is a graph depicting the on-off state of an integrator used in system 110 (FIG. 2), for example integrator $198_1$ (FIG. 5), and the amount of EM radiation integrated in an integrator used in system 110, for example integrator $198_1$, as functions of time, generally referenced 220, constructed in accordance with an embodiment of the disclosed technique. The horizontal axes of graph 220 represent time. Section 222 of the vertical axis represents the on-off state of an integrator and section 224 of the vertical axis represents the total amount of EM radiation energy integrated in an integrator. Graph 220 includes a potential threat time span 225, in which a shift-registry registers counts, threat mode time spans $226_1$, $226_2$ and $226_3$, in which an integrator is cumulatively integrating signals received thereto, an on time span 227, in which an integrator is on and actively integrating the signals received thereto, an off time span 228, in which an integrator is off and not integrating any signals received thereto, and a reset time span 232, in which an integrator is off, not integrating any signals received thereto and reset, thereby containing no accumulated signal. In one embodiment of the disclosed technique, at the end of potential threat time span 225, the shift-registry is reset. In another embodiment of the disclosed technique, the shift-registry may be reset many times in potential threat time span 225. At the end of a threat mode time span, when a predetermined integration threshold, or a predetermined time threshold, is reached, an integrator, for example, integrator $198_1$, is reset. The end of a threat mode time span is demarcated by line 231, where the amount of signal integrated on an integrator is reset back to zero. It is noted that the end of a threat mode time span demarcates the beginning of a reset time span, for example reset time span 232. Reset time span 232 ends once an integrator begins integrating signals received thereto after the integrator was reset. It is noted that many threat mode time spans may exist in a single potential threat time span, and that threat mode time spans $226_1$, $226_2$ and $226_3$ are not equivalent in duration of time. On time span 227 corresponds to the particular duration of time counter controller 116 (FIG. 2) provides a potential threat signal to integration enabler 117 (FIG. 2) when shift-registry 132 (FIG. 3) registers a count. Off time span 228 corresponds to the time when shift-registry 132 does not register any counts.

If incoming radiation 118 (FIG. 5) is short pulsed radiation, (i.e., radiation having a pulse width on the order of nanoseconds) then on time span 227 will be a fixed time span (not shown), as the duration of the potential threat signal counter controller 116 provides to integration enabler 117 will be the same for each registered count. If incoming radiation 118 is radiation emerging from a laser with a duty factor on the order of 50%, (i.e., radiation having a pulse width on an order larger than 100 ns) then on time span 227 will vary in length (as shown), depending on the duration of time the intensity level of incoming radiation 118 stays above a predetermined threshold level. Off time span 228 varies in length of time during a potential threat time period, depending on the nature of the incoming radiation impinging upon system 110, and whether the incoming radiation will cause system 110 to register a count or not. Section 222 of graph 220 depicts the on-off activity of integrators $198_1$ and $198_2$ (FIG. 5). Section 224 of graph 220 depicts the amount of incoming radiation integrated by integrators $198_1$ and $198_2$. Segment 229 corresponds to off time span 228. During off time span 228, integration enabler 117 is disabled. Integrators $198_1$ and $198_2$ therefore receive no signals to integrate. Segment 229 is a horizontal line representing a constant amount of energy, indicating that no signals are being integrated. Segment 230 corresponds to on time span 227. During on time span 227, integration enabler 117 is enabled. Integrators $198_1$ and $198_2$ therefore receive electric signals to integrate. Segment 230 is an increasing sloped curve, representing an increasing amount of energy, indicating that signals are being integrated. Accordingly, integrators $198_1$ and $198_2$ integrate for only a specified amount of time, in a pulsed like manner. Threat mode time spans $226_1$, $226_2$ and $226_3$ are shorter in time, in comparison to potential threat time span 225, in order to prevent integrators $198_1$ and $198_2$ from reaching a saturation point, and in order to allow system 110 (FIG. 2) to actively determine changes in the direction of incoming radiation 118 (FIG. 5).

Figure 7:
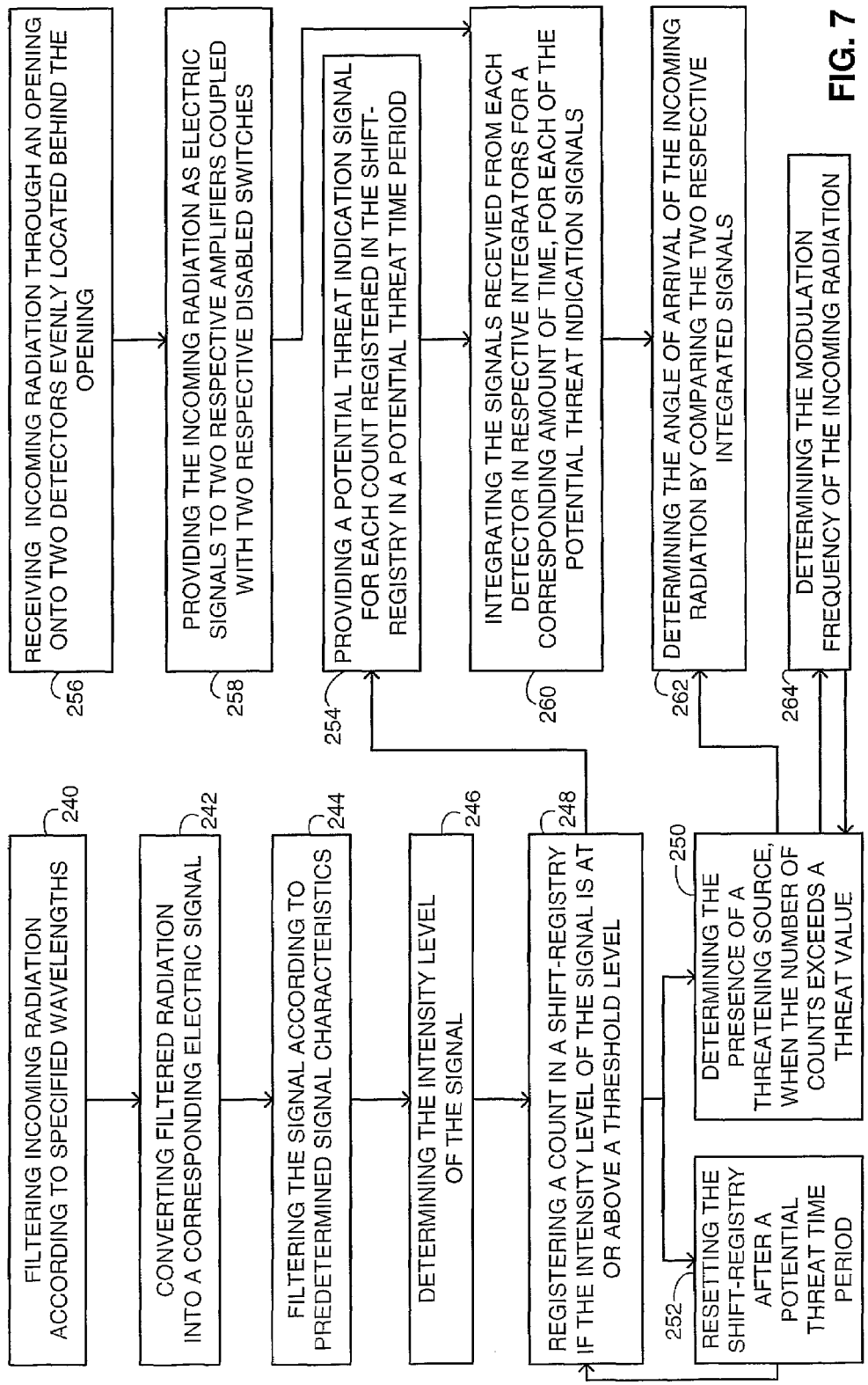
FIG. 7 is a block diagram describing a method operative in accordance with an embodiment of the disclosed technique.

Reference is now made to FIG. 7, which is a block diagram of a method, operative in accordance with an embodiment of the disclosed technique. It is noted that the following method is applicable in scenarios for determining whether incoming radiation originated from a threatening source, or from a non-threatening source, during the day or at night, when the incoming radiation is in pulsed wave form. At night, the method is also applicable for determining whether incoming radiation originated from a threatening source, or from a non-threatening source, when the incoming radiation is in continuous wave form, for example when the incoming radiation is continuous wave infrared radiation. It is also noted that the following method can be used when multiple threatening radiation sources are present.

In procedure 240, incoming radiation is filtered spectrally, according to specified wavelengths. The spectral filtering selectively allows incoming radiation of specified wavelengths to pass through. For example, the spectral filtering may only allow incoming radiation with wavelengths corresponding to the wavelengths of laser beam radiation associated with laser guided weapons, to pass through. In a substitute for procedure 240, incoming radiation is filtered according to specified polarizations corresponding to polarizations associated with laser guided weapons. The incoming radiation is a superimposition of very low power laser radiation originating from a laser source, for example a laser missile system, and noise signals, originating from various radiation sources, for example celestial electromagnetic radiation, like the sun, and distantly located laser range finders. The intensity levels of the very low power laser radiation and pure noise signals are very similar. With reference to FIG. 3, spectral filter 124 selectively allows incoming radiation 118 of specified wavelengths, to pass there through.

In procedure 242, the spectrally filtered incoming radiation is converted into a corresponding electric signal. With reference to FIG. 3, incoming radiation 118 that passes through spectral filter 124 impinges on light sensor 126. Light sensor 126 generates an electric signal corresponding to the laser radiation impinging thereto.

In procedure 244, the converted signal is filtered temporally, according to predetermined sets of electric signal characteristics that correspond to different types of laser spatial encodings. The temporal filtering selectively allows signals corresponding to spatially encoded laser beams to pass through. For example, in a substitute for procedure 244, if the incoming radiation is spatially encoded using different modulation frequencies, $f_1$ to $f_n$, the temporal filtering only allows the signal to pass through if it corresponds to incoming radiation being emitted at a modulation frequency that falls in the range of $f_1$ to $f_n$. Since the incoming radiation may be spatially encoded using different spatial encoding methods, in another substitute for procedure 244, the temporal filtering may include directing the signal to a specific temporal filter corresponding to a particular method of spatially encoding laser beams. In the case where continuous wave form radiation is detected at night, procedure 244 is omitted and the method proceeds from procedure 242 to procedure 246. Procedure 244 is used to differentiate pulsed radiation originating from a threatening source from pulsed radiation and continuous wave radiation originating from a non-threatening source. With reference to FIG. 3, the signal generated by light sensor 126 is provided to temporal filter 128. Temporal filter 128 selectively allows electric signals corresponding to spatially encoded laser beams to pass there through.

In procedure 246, the intensity level of the temporally filtered signal is determined. It is noted that the order of execution of procedures 244 and 246 can be reversed, with procedure 246 being executed before procedure 244 is executed. With reference to FIG. 3, the temporally filtered signal is provided to threshold detector 130 where the intensity level of the signal provided thereto is determined.

In procedure 248, the signal is suspected to have originated from a threatening source and a count is registered in a shift-registry, or in any device capable of counting the number of occurrences of an event, for example, a counter, if the determined intensity level is at a threshold level, or above the threshold level. Otherwise, if the determined intensity level is below the threshold level, the signal is considered a noise signal and is abandoned. In a substitute for procedure 248, if the determined intensity level is at the threshold level, or above the threshold level, a potential threat indication is produced. For each potential threat indication produced, a count is registered in a counter. The threshold level is set above a predetermined value associated with a noise signal. The predetermined value can be, for example, a proportional multiplication of the intensity level of a noise signal.

The threshold level can be determined empirically through field testing, for example in broad daylight, or mathematically through a probability model for false alarms, for example the probability model for false alarms developed by S.O. Rice, as is known in the art (see Equation (1)), and by applying the model to a single pulse of a pulsed form laser beam signal. In procedure 248, the threshold level is set to a fixed sensitivity level, for example a sensitivity level appropriate for use in direct sunlight. In a substitute for procedure 248, the threshold level is varied to different sensitivity levels depending on the time of day of use, for example, a higher sensitivity level during the day, when it is sunny, and a lower sensitivity level during the night, and during the day when it is cloudy. Since the threshold level substantially sets the sensitivity level, the threshold level needs to be set appropriately depending on the scenario and the type of threats to be detected. Counts are registered for a potential threat time period, for example, for a time period of 20 milliseconds. With reference to FIG. 3, if the intensity level of the signal, determined by threshold detector 130, is at threshold level 106 (FIG. 1), or above threshold level 106, the signal is suspected to have originated from a threatening source and threshold detector 130 provides a signal to shift-registry 132 to register a count. If the intensity level of the signal, determined by threshold detector 130, is below threshold level 106, the signal is considered a noise signal and is abandoned.

In procedure 250, the presence of a threatening source is determined (i.e., the incoming radiation is determined if it originated from a threatening source). Incoming radiation is considered to have originated from a threatening source if a count is registered in a hit register of the shift-registry in a potential threat time period. The hit register corresponds to the number of counts registered in a potential threat time period such that incoming radiation can be considered with certainty as having originated from a threatening source. This number of counts is called the hit value, or the threat value, and can be predetermined by using Equation (2) depending on the desired sensitivity level. Procedure 250 therefore includes determining if a "1" bit is registered in the hit register or not. With reference to FIG. 5, system 110 goes into a threat mode once hit register 138 (FIG. 3) registers a count.

In procedure 252, at the end of each potential threat time period, the shift-registry is reset by changing all the bits stored in the shift-registry to "0" bits. The method then returns to procedure 248, where counts are registered in a shift-registry if the intensity of the signal is at or above the threshold level. With reference to FIG. 3, at the end of each potential threat time period, counter controller 116 resets all bits stored in registers $136_1$, $136_2$ and $136_N$ to "0" bits.

In procedure 254, a potential threat signal of a particular time duration, or a potential threat indication of a particular time duration, is provided for each count registered in the shift-registry in a potential threat time period. The particular time duration of the potential threat signal, or potential threat indication, depends on the nature of the incoming radiation. If the incoming radiation is short pulsed radiation, (i.e., radiation having a pulse width on the order of nanoseconds) then the potential threat signal is provided for a predetermined duration of time. The predetermined duration of time can be determined theoretically, empirically, through field tests of the method of FIG. 7 or by known properties of a threatening source. If the incoming radiation is radiation emerging from a laser with a duty factor on the order of 50% (i.e., radiation having a pulse width on an order larger than 100 ns), then the potential threat signal is provided for the duration of time the intensity level of the signal is at or above a threshold level (procedure 248). As the number of counts registered in the potential threat time period increases, the probability that the incoming radiation originated from a threatening source also increases. With reference to FIG. 2, laser beam detection module 112 provides a potential threat signal to counter controller 116 when incoming radiation 118 is suspected to have originated from a threatening source.

In procedure 256, incoming radiation is received through an opening, or an aperture, which allows an amount of laser beam radiation to pass there through, onto at least two detectors. The at least two detectors are located behind the opening, adjacent to one another. In a substitute for procedure 256, the detectors are evenly located behind the opening, such that laser beam radiation, passing through the opening perpendicularly, falls on an equal amount of surface on both detectors. In another substitute for procedure 256, the detectors are not located adjacent to one another, but are evenly located behind the opening. In a further substitute for procedure 256, the detectors are not located adjacent to one another and are not evenly located behind the opening. However, the detectors are located behind the opening such that different amounts of the incoming radiation impinge upon each of the surfaces of the detectors, for different angles of arrival of the incoming radiation. In an another substitute for procedure 256, the opening has substantially the same width as each of the detectors, such that when incoming radiation passes through the opening perpendicularly, the incoming radiation impinges upon substantially half of the total surface area of each of the detectors. In a further substitute for procedure 256, the opening has a width that is substantially not equal to the width of the detectors.

The detectors can be, for example, photodetectors. Since the detectors are evenly located behind the slit, more laser beam radiation will impinge upon the surface of one of the detectors if the angle of arrival of the incoming radiation is not perpendicular to the surface of the detectors. The difference between the amount of laser beam radiation impinging on the surfaces of each of the detectors can be used to determine the angle of arrival of the incoming radiation. In another substitute for procedure 256, the detectors are located behind the opening such that different amounts of incoming radiation impinge upon each of the surfaces of the detectors, for different angles of arrival of incoming radiation. With reference to FIG. 5, incoming radiation 118 impinges on plate 190. Plate 190 allows an amount of laser beam radiation to pass through opening 191 and fall incident on detectors $192_1$ and $192_2$. Detectors $192_1$ and $192_2$ are evenly located behind opening 191.

In procedure 258, an electric signal is generated in each detector corresponding to the amount of laser beam radiation impinging upon its respective surface. The signals generated are each respectively provided to two respective amplifiers, which in turn, are each coupled with two respective disabled switches. The switches can be any device which is operative to enable and disable integrators from integrating. The switches can also be replaced by a single switch. The generated signals are provided to the respective amplifiers continuously. It is noted that procedures 240 to 254 are executed simultaneously as procedures 256 to 258 are executed. With reference to FIG. 5, detectors $192_1$ and $192_2$ each generate an electric signal corresponding to the amount of laser beam radiation impinging upon their respective surfaces. Detectors $192_1$ and $192_2$ continuously provide respective signals to amplifiers $194_1$ and $194_2$. Amplifiers $194_1$ and $194_2$ provide their respective signals to integrators $198_1$ and $198_2$. Integration enabler 117 enables and disables integrators $198_1$ and $198_2$. When no potential threat signal is detected by integration enabler 117, from counter controller 116, integrators $198_1$ and $198_2$ are disabled and, thereby, do not integrate any signal received thereto. In an alternative to procedure 258, depending on the wavelength, polarization and spatial encoding of the incoming radiation, the signals generated on each detector are each respectively directed and provided to a corresponding set of amplifiers, which in turn, are each coupled with corresponding respective disabled switches. With reference to FIG. 5, detectors $192_1$ and $192_2$ each generate an electric signal corresponding to the amount of laser beam radiation impinging upon their respective surfaces. According to the wavelength, polarization and spatial encoding of the incoming radiation, the electric signals generated by detectors $192_1$ and $192_2$ are each respectively directed and provided to a corresponding set of amplifiers and integrators via the switch.

In procedure 260, the two respective disabled switches are enabled for a corresponding particular duration of time each time a potential threat signal is received, thereby enabling the generated signals in procedure 258 to be integrated in two respective integrators. Therefore, each time a count is registered in procedure 248, the generated signals in procedure 258 are integrated in procedure 260 in two respective integrators for a particular duration of time. The switches remain enabled as long as a potential threat signal is being provided thereto. The respective integrators cumulatively integrate signals being provided thereto until a predetermined integration threshold, or a predetermined time threshold, is reached, at which point the respective integrators are reset. The predetermined integration threshold can be, for example, the signal saturation value of the integrators. The predetermined time threshold can be, for example, the amount of time required for a system to identify a change in direction of the incoming radiation, which could be, for example, on the order of milliseconds. It is noted that in a threat mode, the integrators may be reset many times in a potential threat time period. The respective integrators may also cumulatively integrate signals being provided thereto until the end of a potential threat time period, when all the bits in the shift-registry are reset back to "0" bits. The bits in the shift-registry may also be reset back to "0" bits if any of the following criteria are true: the sum of the measured intensity level of the incoming radiation, on the detecting surfaces of detectors, is less than a predetermined intensity threshold level, a count has not been registered in the shift-registry for a predetermined amount of time, for example a few milliseconds, or the incoming radiation is incident on only one of the detectors. It is noted that in using these criteria, for resetting all the bits in the shift-registry back to "0" bits, the shift-registry may be reset many times within a single potential threat time period. With reference to FIG. 5, when no potential threat signal is detected by integration enabler 117, from counter controller 116, integrators $198_1$ and $198_2$ are disabled and, thereby, do not integrate any signal received thereto. When a potential threat signal is detected by integration enabler 117, from counter controller 116, integrators $198_1$ and $198_2$ are enabled and, thereby, integrate signals received thereto. Integrators $198_1$ and $198_2$ remain enabled as long as integration enabler 117 receives a potential threat signal from counter controller 116. If a count is registered in shift-registry 132, counter controller 116 provides a potential threat signal, of a particular duration of time, to integration enabler 117, which in turn enables integrators $198_1$ and $198_2$ for a corresponding particular amount of time. Integrators $198_1$ and $198_2$ cumulatively integrate until system 110 (FIG. 2) goes into a threat mode. In a threat mode, integrators $198_1$ and $198_2$ continue to cumulatively integrate until a predetermined integration threshold, or a predetermined time threshold, is reached, at which point the integrators are reset. Integrators $198_1$ and $198_2$ may also cumulatively integrate until the end of a potential threat time period, when counter controller 116 resets all the bits in shift-registry 132 back to "0" bits. In an alternative to procedure 260, the corresponding respective disabled switches are enabled for a corresponding particular duration of time, each time a potential threat signal is received, thereby enabling the generated signals in procedure 258 to be integrated in corresponding respective integrators. The respective integrators cumulatively integrate signals being provided thereto until a predetermined integration threshold, or a predetermined time threshold, is reached, at which point the respective integrators are reset. With reference to FIG. 5, according to the wavelength, polarization and spatial encoding of the incoming radiation, the electric signals generated by detectors $192_1$ and $192_2$ are each respectively directed and provided to a corresponding set of amplifiers and integrators via the switch.

In procedure 262, the angle of arrival of the incoming radiation is determined by comparing the two respective integrated signals. The comparing, executed in procedure 262, can include subtracting the integrated signal of one integrator from the integrated signal of the other integrator. The subtraction result is normalized by dividing the subtraction result by the sum of the two respective integrated signals. The comparing can further include retrieving the angle of arrival corresponding to the integrated signals of the integrators in a normalized look-up table. It is noted that procedure 262 is executed only if in procedure 250, a count is found in the hit register, (i.e., the probability that the incoming radiation originated from a threatening source is substantially high). If no count is found in the hit register, then the cumulated integrated signal of procedure 260 is abandoned and procedure 262 is not executed. With reference to FIG. 5, if hit register 138 contains a "0" bit, then counter controller 116 provides a signal to integration enabler 117, which in turn provides a signal to processor 200, to abandon the cumulative integrated signal of integrators $198_1$ and $198_2$. If hit register 138 contains a "1" bit, then counter controller 116 provides a signal to integration enabler 117, which in turn provides a signal to processor 200, to determine the angle of arrival of incoming radiation 118 based on the cumulative integrated signal of integrators $198_1$ and $198_2$. Processor 200 determines the angle of arrival of incoming radiation 118 by comparing the signals received from integrators $198_1$ and $198_2$, and provides the determined angle of arrival to a user.

In procedure 264, if the incoming radiation is determined to have originated from a threatening source, then the modulation frequency of the incoming radiation is determined. The modulation frequency is determined by lowering the hit value, and by dividing the hit value by the duration of time it takes a shift-registry to register a count in its hit register. The modulation frequency is determined in order to continuously verify that the incoming radiation is still originating from a threatening source. With reference to FIG. 3, as the probability that incoming radiation 118 originated from a threatening source increases, the threat value is lowered. The threat value is lowered once laser beam detection module 112 has determined that incoming radiation 118 originated from a threatening source. Counter controller 116 then determines the modulation frequency of incoming radiation 118.

It will be appreciated by persons skilled in the art that the disclosed technique is not limited to what has been particularly shown and described hereinabove. Rather the scope of the disclosed technique is defined only by the claims, which follow.

The invention claimed is:

1. Apparatus for determining a direction of low power radiation, said low power radiation originating from at least one source, said radiation arriving essentially collimated, the apparatus comprising:
   an opening, for receiving incoming radiation;
   at least two radiation sensors, located at different spatial locations behind said opening, each said radiation sensor detecting at least a respective portion of said incoming radiation, received from said opening and converting said respective portion of said incoming radiation into a respective electric signal;
   for each said radiation sensor, at least one respective integrator, coupled with said respective radiation sensor, for integrating said respective electric signal;
   an integration enabler, coupled with each of said at least two respective integrators,
   a threat detector, coupled with said integration enabler, for detecting threats and producing a threat indication for each said detected threat; and
   a processor, coupled with said integrators and said threat detector, for determining said direction according to the amounts of said electrical signals integrated by said integrators.

2. The apparatus according to claim 1, further including a switch, coupled with said at least two radiation sensors and said at least one respective integrator, for directing said respective electric signal to a corresponding one of said at least one respective integrator.

3. The apparatus according to claim 1, wherein said incoming radiation impinges upon each of said at least two radiation sensors.

4. The apparatus according to claim 1, wherein said integration enabling device is coupled with each of said at least two respective integrators via said respective radiation sensors.

5. The apparatus according to claim 1, wherein said processor comprises an analog-to-digital converter.

6. The apparatus according to claim 1, wherein said processor determines said direction by subtracting said amount of said electric signal integrated by one of said respective integrators from said amount of said electric signal integrated by another one of said respective integrators, thereby producing a subtraction result.

7. The apparatus according to claim 6, wherein said subtraction result is normalized by dividing said subtraction result by the sum of said amounts of said electric signals integrated.

8. The apparatus according to claim 1, wherein said processor determines said direction by retrieving the direction corresponding to said amounts of said electric signals integrated in a normalized look-up table.

9. The apparatus according to claim 1, wherein said threat detector comprises:
an optical filter, for filtering specified optical properties of said incoming radiation,
a radiation sensor, for detecting said incoming radiation and converting said incoming radiation into a corresponding electric signal, said radiation sensor being optically coupled with said optical filter,
a threshold detector, for determining an intensity level of said electric signal and producing a potential threat indication each time said intensity level exceeds a threshold level, said threshold detector being coupled with said radiation sensor,
at least one temporal filter, for filtering predetermined sets of electric signal characteristics corresponding to spatial encodings of said incoming radiation, said at least one temporal filter being coupled with said radiation sensor and said threshold detector,
a counter, for counting the number of said potential threat indications, within a potential threat time period, said counter being coupled with said threshold detector and said integration enabling device,
wherein said counter produces said threat indication, if the number of said counted potential threat indications, within said potential threat time period, exceeds a threat value.

10. The apparatus according to claim 9, wherein said threat detector resets said counter after each said potential threat time period.

11. The apparatus according to claim 9, wherein said threat detector resets said counter if the sum of said at least respective portion of said incoming radiation, detected by said at least two radiation sensors, is less than a predetermined intensity threshold level.

12. The apparatus according to claim 9, wherein said threat detector resets said counter if an insufficient number of said potential threat indications are counted in a predetermined amount of time.

13. The apparatus according to claim 9, wherein said threat detector resets said counter if said radiation is only detected by one of said at least two radiation sensors.

14. The apparatus according to claim 9, wherein said threat value is substantially determined using the following equation:

$$P(D) = \sum_{j=m}^{n} q^j \cdot (1-q)^{n-j} \frac{n!}{j! \cdot (n-j)!}$$

wherein P(D) defines the overall probability that said detected incoming radiation originated from a threatening source,
wherein q defines the probability that an individual one of said potential threat indications, which actually corresponds to said detected incoming radiation originating from a threatening source, will be at or above said threshold level,
wherein q is determined by a probability model for false alarms applied to a single pulse of said incoming radiation,
wherein j is an index number,
wherein m defines said threat value, and
wherein n defines the maximum number of times said radiation is verified, in said potential threat time period, to determine if said potential threat indication will be produced.

15. The apparatus according to claim 9, wherein said threshold level is set above a proportional multiplication of the intensity level of a noise signal.

16. The apparatus according to claim 9, wherein said threshold level is calculated by applying a probability model for false alarms to a single pulse of said incoming radiation.

17. The apparatus according to claim 9, wherein said threshold level is determined by exposing said radiation sensor to broad daylight.

18. The apparatus according to claim 1, further comprising a respective amplifier for each said radiation sensor.

19. The apparatus according to claim 18, wherein said integration enabling device is coupled with each of said at least two respective integrators via said at least two respective amplifiers.

20. The apparatus according to claim 18, further comprising a respective diode for each of said respective integrators, each diode being respectively coupled with one of said respective amplifiers and with one of said respective integrators.

21. The apparatus according to claim 1, further comprising a shutter, said shutter located in front of said opening.

22. The apparatus according to claim 21, wherein said integration enabling device is coupled with each of said at least two respective integrators via said shutter.

23. The apparatus according to claim 9, wherein said integration enabling device enables said respective integrators for a predetermined amount of time each time said threshold detector produces said potential threat indication.

24. The apparatus according to claim 23, wherein said predetermined amount of time depends on the characteristics of said radiation.

25. The apparatus according to claim 1, wherein said processor determines said direction only when said threat detector produces said threat indication.

26. The apparatus according to claim 1, wherein said respective integrators are reset if a predetermined threshold is reached.

27. The apparatus according to claim 26, wherein said predetermined threshold is selected from the list consisting of: the signal saturation value of said respective integrators and the amount of time said apparatus would require to identify a change in direction of said radiation.

28. Method for determining the direction of low power incoming radiation, said low power radiation originating from at least one source, said incoming radiation arriving essentially collimated, comprising the procedures of:
receiving said incoming radiation through an opening onto at least two radiation detectors, said radiation detectors located behind said opening, said radiation detectors configured to each receive different amounts of said incoming radiation for different directions of said incoming radiation;
providing said incoming radiation on said at least two radiation detectors as respective electric signals;
integrating each of said respective electric signals, thereby producing a respective integrated amount, said integrating commencing upon receiving a potential threat indication;
determining if said incoming radiation originated from a threatening source; and
determining a direction for said incoming radiation, if said incoming radiation originated from a threatening source, by comparing said respective amounts of incoming radiation impinging upon said at least two radiation detectors wherein said procedure of determining if said incoming raditaion originated from said threatening source comprises the sub-procedures of: producing said potential threat indication each time said electric signals exceed a threshold level; counting the number of said potential threat indications, within a potential threat time period; and producing a threat indication, if the number of said counted potential threat indications, within said potential threat time period, exceeds a threat value, wherein said threat indication indicates that said incoming radiation originated from said threatening source.

29. The method according to claim 28, wherein said comparing comprises subtracting said respective amount of radiation impinging on one of said at least two radiation detectors from said respective amount of radiation impinging upon the other of said at least two radiation detectors, thereby producing a subtraction result, wherein said subtraction result is normalized by dividing said subtraction result by the sum of said respective amounts of radiation impinging on said at least two radiation detectors, thereby determining said direction of said incoming radiation.

30. The method according to claim 28, wherein said comparing comprises looking up, in a normalized look-up table, said respective amounts of radiation impinging upon each of said at least two radiation detectors, thereby determining said direction of said radiation.

31. The method according to claim 28, further comprising the procedure of producing said potential threat indication each time said respective electric signals exceed a threshold level, said potential threat indication being produced for a predetermined amount of time.

32. The method according to claim 31, wherein said predetermined amount of time depends on the characteristics of said radiation.

33. The method according to claim 31, wherein said threshold level is set above a proportional multiplication of the intensity level of a noise signal.

34. The method according to claim 31, wherein said threshold level is calculated by applying a probability model for false alarms to a single pulse of said incoming radiation.

35. The method according to claim 31, wherein said threshold level is calculated by field tests in broad daylight.

36. The method according to claim 31, wherein said threshold level is constant.

37. The method according to claim 31, wherein said threshold level is varied according to the time of day said method is used.

38. The method according to claim 28, further comprising the procedure of resetting said integrated amount if a predetermined threshold is reached.

39. The method according to claim 38, wherein said predetermined threshold is selected from the list consisting of: the signal saturation value of said integrated amount and the amount of time required to identify a change in the direction of said radiation.

40. The method according to claim 28, further comprising the sub-procedure of resetting said counted number of potential threat indications after said potential threat time period.

41. The method according to claim 28, wherein said threat value is substantially determined using the following equation:

$$P(D) = \sum_{j=m}^{n} q^j \cdot (1-q)^{n-j} \frac{n!}{j! \cdot (n-j)!}$$

wherein P(D) defines the overall probability that said received incoming radiation originated from said threatening source, wherein q defines the probability that an individual one of said potential threat indications, which actually corresponds to said received incoming radiation originating from said threatening source, will be at or above said threshold level, wherein q is determined by a probability model for false alarms applied to a single pulse of said received incoming radiation, wherein j is an index number, wherein m defines said threat value, and wherein n defines the maximum number of times said received incoming radiation is verified, in said potential threat time period, to determine if said potential threat indication will be produced.

* * * * *